(12) United States Patent
Kaneda et al.

(10) Patent No.: US 7,529,381 B2
(45) Date of Patent: May 5, 2009

(54) MULTIFUNCTION-TYPE VIBRATION ACTUATOR AND PORTABLE COMMUNICATION EQUIPMENT

(75) Inventors: Shoichi Kaneda, Tokyo (JP); Minoru Ueda, Tokyo (JP)

(73) Assignee: Namiki Seimitsu Houseki Kabushiki, Tokyo (JP)

( * ) Notice: Subject to any disclaimer, the term of this patent is extended or adjusted under 35 U.S.C. 154(b) by 335 days.

(21) Appl. No.: 10/590,319

(22) PCT Filed: Feb. 25, 2005

(86) PCT No.: PCT/JP2005/003103

§ 371 (c)(1),
(2), (4) Date: Aug. 23, 2006

(87) PCT Pub. No.: WO2005/084073

PCT Pub. Date: Sep. 9, 2005

(65) Prior Publication Data
US 2007/0187172 A1    Aug. 16, 2007

(30) Foreign Application Priority Data
Feb. 27, 2004    (JP)    ............................. 2004-053587

(51) Int. Cl.
*H04R 1/00*    (2006.01)
*H04R 9/06*    (2006.01)
(52) U.S. Cl. .................. 381/403; 381/400; 381/412
(58) Field of Classification Search .................. 381/396, 381/398, 400, 401, 402, 403, 412, 421, 424, 381/431
See application file for complete search history.

(56) References Cited

U.S. PATENT DOCUMENTS 7,369,674 B2 *    5/2008   Miura .......................... 381/401

FOREIGN PATENT DOCUMENTS

| JP | 61-30200 | 2/1986 |
| JP | 6-296299 | 10/1994 |
| JP | 2002-201396 | 7/2000 |
| JP | 2001-231093 | 8/2001 |
| JP | 2002-307013 | 10/2002 |
| JP | 2002-336786 | 11/2002 |
| WO | WO 2005/107315 A1 * | 11/2005 |

OTHER PUBLICATIONS

International Search Report Application No. PCT/JP2005/003103 dated Jun. 7, 2005.

* cited by examiner

*Primary Examiner*—Brian Ensey
(74) *Attorney, Agent, or Firm*—Studebaker & Brackett PC; Donald R. Studebaker

(57) ABSTRACT

A multifunction vibration actuator is disclosed, which includes a housing (1) integrally formed with a first house part (1a) with an elliptic wall (10), a second house part (1b) having a cylindrical wall (11) with a diameter corresponding to the first house part (1a) at the center of the ellipse, and both bottom walls (1c) and (1d) of the first housing part (1a). The actuator also includes an elliptic diaphragm (3) with an annular voice coil (3) installed on the inner surface thereof, a circular magnetic circuit part (4), and a disk type suspension (5). The elliptic diaphragm (3) is tightly installed in the wall of the first house part (1a), and the circular magnetic circuit part (4) is installed in the cylinder of the second house part (1b) with the suspension (5).

7 Claims, 10 Drawing Sheets

MULTIFUNCTION-TYPE VIBRATION ACTUATOR AND PORTABLE COMMUNICATION EQUIPMENT

BACKGROUND (1) Field of the Invention

This invention relates to a multifunction-type vibration actuator integrally provided with functions of a speaker, a vibrator, and a buzzer and portable communication equipment mounted with the multifunction-type vibration actuator.

(2) Description of the Related Art

A multifunction-type vibration actuator is integrally provided with a speaker function for sound, a vibrator function for vibration, and a buzzer function for calling to be mounted on portable communication equipment such as a mobile phone and so on. In order to improve spatial efficiency in a device while securing a broad frequency band to keep high tone quality and output, mounting a small-size multifunction-type vibration actuator is desired.

In order to satisfy the requirement, a unit equipped with an elliptic diaphragm that is smaller than a circular diaphragm in width is proposed while keeping almost the same total area See, for example, JP2000-201396A and JP2002-307013A.

The multifunction-type vibration actuator according to prior art is assembled not only with an elliptic housing but also a magnetic circuit part composed of a yoke, a magnet, and a pole piece, as well as a voice coil and a suspension for holding the magnet circuit part, all of which are formed in an elliptic shape.

When an actuator is assembled with parts, all of which are formed in an elliptic shape, the price is high as a multifunction-type vibration actuator because the difficulty in shaping a yoke, a magnet, and a pole piece for the magnetic circuit part results in a high manufacturing cost. In addition, since a housing is totally formed in an elliptic shape, although a lateral space can be saved inside a device, a longitudinal space cannot be saved.

BRIEF SUMMARY OF THE INVENTION

The problem to be solved by the invention is to provide a multifunction-type vibration actuator capable of maintaining high tone quality and output by increasing a frequency band with an elliptic diaphragm for the purpose of improving tone quality, reducing labor and cost in assembly, and improving the space efficiency thereof in equipment in which the actuator is mounted.

In addition, the problem is also to provide a multifunction-type vibration actuator having a preferable appearance from the viewpoint of weight balance of the diaphragm, assembly of a suspension, arrangement of an external terminal, and so on.

Embodiments of the invention provide a multifunction-type vibration actuator comprising a magnetic circuit part assembled with a thin, plate-like diaphragm to an inner surface of which a voice coil, yoke, magnet, pole piece, and a leaf spring-like suspension for holding the circuit part is installed, wherein the magnet circuit part is assembled inside a wall of a housing with the suspension; the voice coil is inserted into a magnetic gap of the magnetic circuit part so that the diaphragm fits tightly inside the wall of the housing, and the voice coil is electrically connected to an external terminal with lead wires pulled out to an outside of the wall; and also comprising a housing integrally formed with a first house part with an elliptic wall and a second house part with a cylindrical wall of which a diameter corresponds to a width of the first house part at a center of a ellipse at both bottom walls of the first house part, an elliptic diaphragm to which an inner surface of an annular voice coil is installed, a circular magnetic circuit part provided with a magnetic gap into which the voice coil is inserted, and a disk-shaped suspension, wherein the elliptic diaphragm fits tightly inside a wall of the first house part, and the circular magnetic circuit part is assembled in a cylinder of the second house part with the suspension.

Other embodiments of the invention provide a multifunction-type vibration actuator comprising an elliptic diaphragm on a plate surface, which is provided with a plurality of V-grooves that radially extend at the same angle from a dome-shaped part surrounded by an annular voice coil at a center of a plate surface and that are long on the semicircular plate surfaces located at both sides in the longitudinal direction and short on the plate surfaces located at both sides in the lateral direction.

Other embodiments of the invention provide a multifunction-type vibration actuator comprising an elliptic diaphragm, wherein lead wires of the voice coil are pulled out toward both sides while divided into positive and negative poles on a same semicircular plate surface from a dome-shaped part at a center of the plate surface.

In other embodiments of the invention, a multifunction-type vibration actuator can be equipped with a suspension that comprises a central ring part for holding a circular magnetic circuit part and three arm parts circumferentially extending in the same direction with a same length from the proximal ends of the arms located apart from each other at an angle of 120.degree. on the ring part, wherein the distal end of one of the arm parts extending outward from the second house part is fitted and fixed in a dent located in the middle of one of bottom wall surfaces, and the distal ends of the remaining two arm parts extending outward from the second house part are fitted and fixed in dents located at both sides of another bottom wall surface of the first house part.

In another embodiment, a multifunction-type vibration actuator is equipped with a suspension having three arm parts of which the distal ends are formed in different shapes, wherein dents corresponding to a shape of each arm distal end are provided in a bottom wall surface of the first house part to install the suspension in a cylinder of the second house part by fitting the distal ends of the arms in the dents.

In other embodiments of the invention, an external terminal electrically connected to a voice coil is formed with a printed circuit board, and the printed circuit board is installed to a bottom wall surface opposite to a diaphragm fitted surface at one of the bottom walls of the first house part.

Another embodiment of the invention provides portable communication equipment mounted with a multifunction-type vibration actuator according to one of the embodiments described above.

Since a multifunction-type vibration actuator according to embodiments of the invention comprises an elliptic diaphragm fit tightly in an elliptic wall of a first house part and, on the other hand, a circular magnetic circuit part assembled inside a cylindrical wall of a second house part with a suspension, an elliptic diaphragm with a large diameter enables an increased frequency band to improve tone and output as a speaker function, and moreover since the actuator contains the suspension and the circularly formed magnetic circuit part, the labor for forming, installing, and assembling components, as well as the cost for manufacturing parts, can be reduced.

In addition, since an embodiment may include a second house part with the cylindrical wall having a diameter corresponding to the lateral dimension of the first house part is provided in the equipment, the bottom wall spaces of the first house part extending to both sides of the second house part can be used as mounting spaces for other parts, the elliptic wall of the first house part can contribute to reducing the dimension in the lateral direction, and moreover, spatial efficiency for devices to be mounted inside the equipment can be improved.

Since a multifunction-type vibration actuator according to an embodiment of the invention may be equipped with a diaphragm having a plate surface on which radial V-grooves are provided in the tangential direction at the same angle to a vibration part at the center of the plate surface, a phase shift of sound wave transmitted to the plate surface can be prevented to maintain high tone quality and output as a speaker function, and moreover, since the above-mentioned V-grooves are long on the semicircular plate surfaces located at both sides in the longitudinal direction and short on the plate surfaces located at both sides in the lateral direction, the diaphragm can secure sufficient rigidity even if the diaphragm is formed in an elliptic shape.

A multifunction-type vibration actuator according to an embodiment of the invention equipped with an elliptic diaphragm provided with a voice coil of which lead wires are pulled out toward both sides while divided into positive and negative poles on the same semicircular plate surface from a dome-shaped part at the center of the plate surface keeps the weight balance of the diaphragm equal for equipment having high tone quality and output.

In a multifunction-type vibration actuator according to an embodiment of the invention, since a distal end of one of the arm parts extending outward from the second house part is fitted and fixed in a dent located in the middle of one of the bottom wall surfaces and distal ends of the remaining two arm parts extending outward from the second house part are fitted and fixed in dents located at both sides of another bottom wall surface of the first house part, increase of the width in the lateral direction due to the presence of the elliptic first house part can be prevented, stable vibration performance can be provided by allowing the suspension to support the magnetic circuit part at three points, and generation of metallic fatigue can be minimized because the suspension has the long arms.

In a multifunction-type vibration actuator according to an embodiment of the invention, since distal ends of arms are formed in different shapes and dents corresponding to a shape of each distal end of the arm are provided in a bottom wall surface of the first house part, the magnetic circuit part can be easily and correctly installed in the cylinder of the second house part by fitting the distal ends of the suspension arm in the dents.

In a multifunction-type vibration actuator according to an embodiment of the invention, since an external terminal electrically connected to a voice coil is formed by a printed circuit board, and the printed circuit board is installed to the one bottom wall surface of the first house part opposite the other bottom wall surface facing the diaphragm, the necessity of a specific mounting space that may be required when the external terminal protrudes from the housing can be eliminated, keeping the whole actuator compact.

Since portable communication equipment according to an embodiment of the invention is mounted with a multifunction-type vibration actuator according to one of above described embodiments, the space inside the equipment can effectively be utilized to facilitate assembly of portable communication equipment having high tone quality and output.

DETAILED DESCRIPTION

Figure 1:
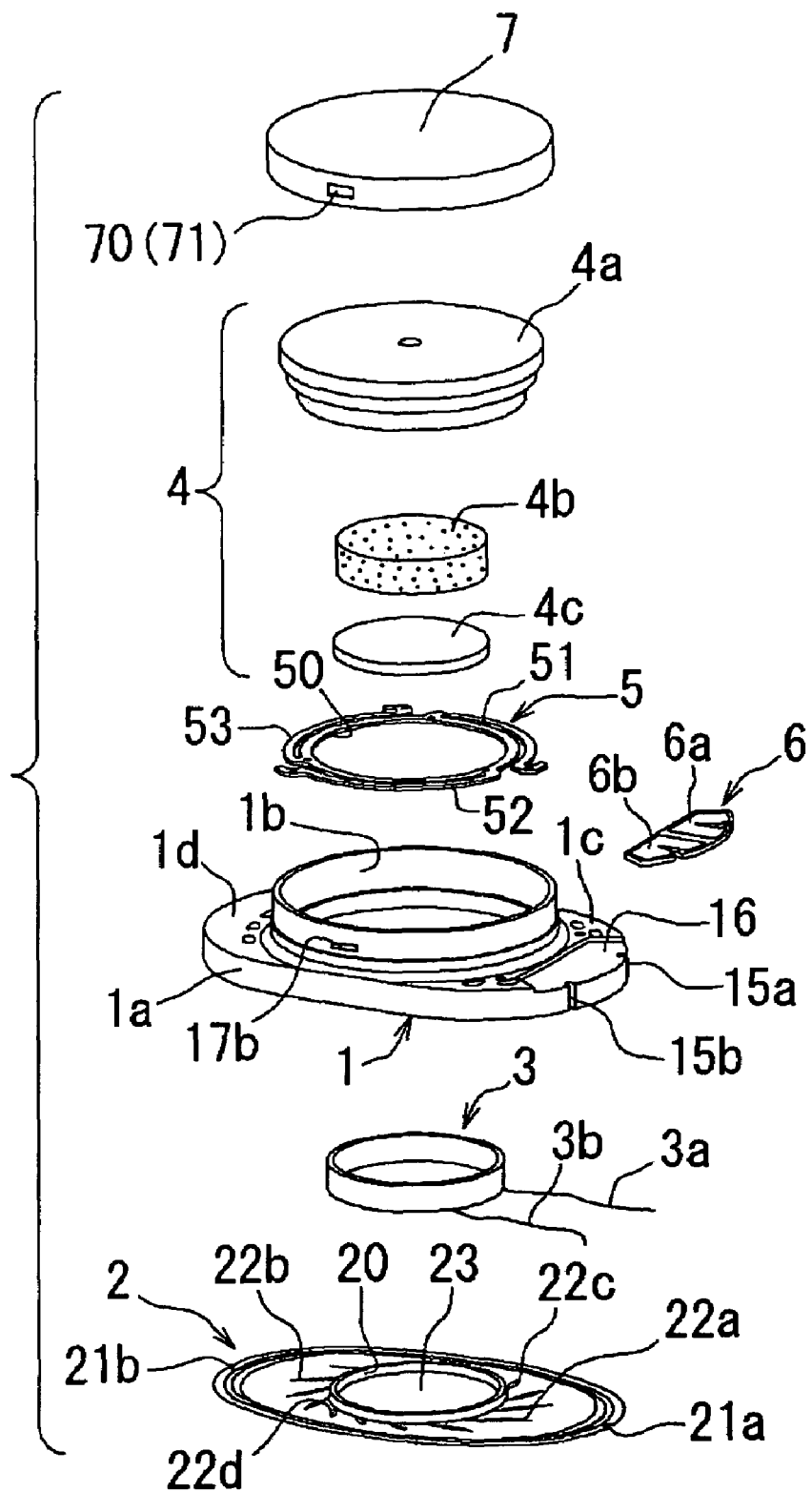
FIG. 1 is an exploded perspective view showing parts configuring a multifunction-type vibration actuator according to the invention.

FIG. 1 is an exploded perspective view showing parts configuring a multifunction-type vibration actuator. In this view, item 1 is a housing, 2 a diaphragm, 3 a voice coil, 4 a magnetic circuit part, 4a a yoke of the magnetic circuit part, 4b a magnet of the magnetic circuit part, 4c a pole piece of the magnetic circuit part, 5 a suspension, 6 an external terminal, and 7 a cover. Although, in FIG. 1, the cover 7 is arranged at the top and the diaphragm 2 at the bottom, in FIGS. 2 through 8, the components are inverted from FIG. 1 based on a mounting direction of the multifunction-type vibration actuator.

Figure 2:
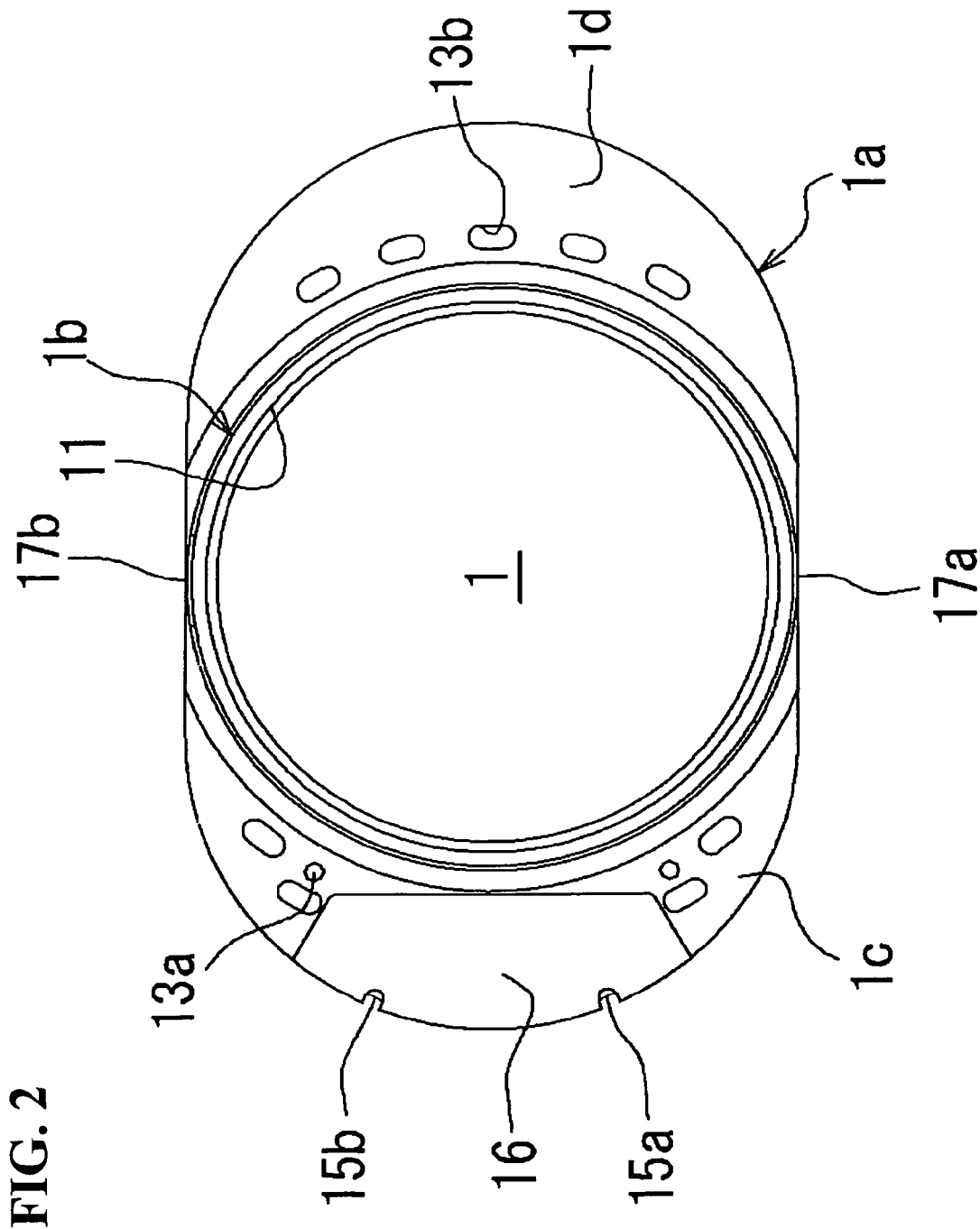
FIG. 2 is a back view showing a housing forming the multifunction-type vibration actuator shown in FIG. 1.
Figure 3:
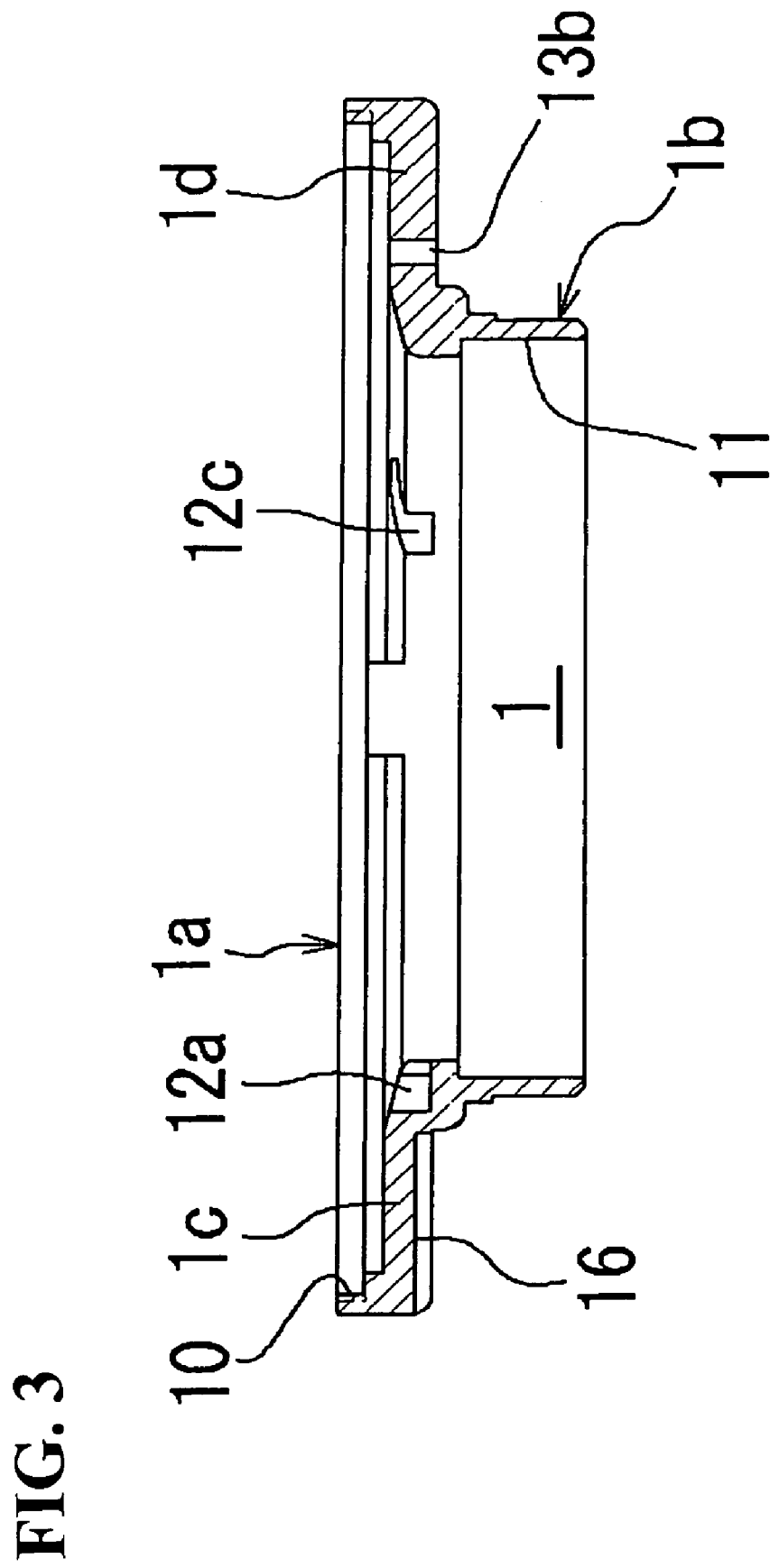
FIG. 3 is a cross-sectional view showing the housing in FIG. 2.

The housing 1 is mainly equipped with a first house part 1a having an elliptic wall 10 and a second house part 1b having a cylindrical wall 11 as shown in FIGS. 2 and 3. The house parts 1a and 1b are integrally formed with two bottom walls 1c and 1d of the first house part 1a having crescent-like flanges.

Figure 4:
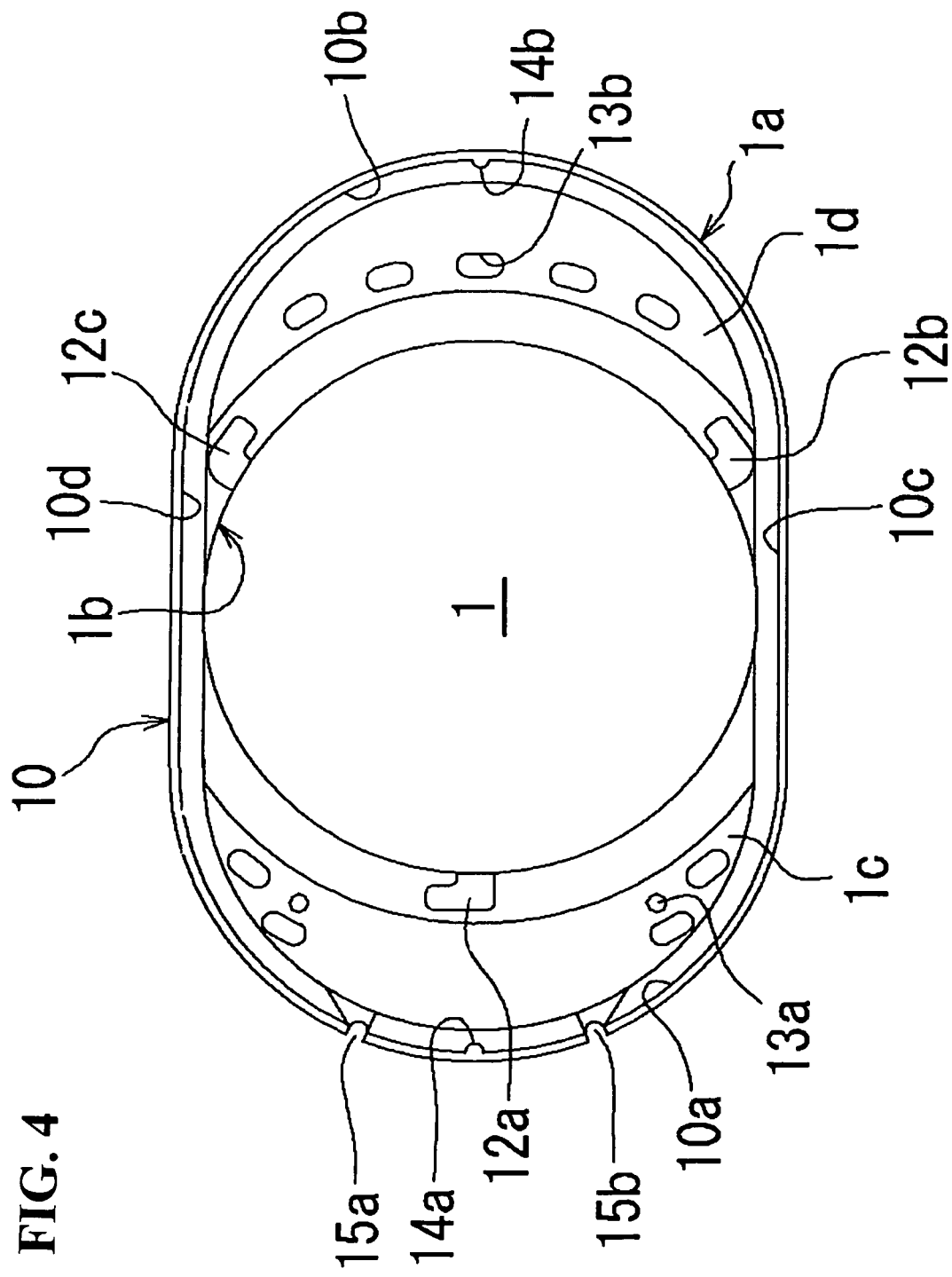
FIG. 4 is a top view showing the housing in FIG. 2.

The elliptic wall 10 of the first house part 1a is formed as an elliptic shape where semicircular walls 10a and 10b of both sides are connected to opposing linear walls 10c and 10d to provide a continuous elliptic shape as shown in FIG. 4. The cylindrical wall 11 of the second house part 1b is formed as a true circle with a diameter corresponding to an interval between the linear walls 10c and 10d facing the center of the ellipse of the first house part, namely the breadth of the ellipse.

Both bottom walls 1c and 1d of the first house part 1a are provided with three dents 12a through 12c corresponding to three arms of the suspension 5 and extending from the inner diameter edge of the second house part 1b to the inner surfaces of both bottom walls 1c and 1d. The dents 12a through 12c are provided so that one is positioned in the middle of the inner semicircle of one bottom wall 1c and the remaining two are positioned on both sides of the inner semicircle of the other bottom wall 1d. These dents 12a through 12c are formed in different shapes corresponding to the distal shapes of the suspension 5 as described later.

Both bottom walls 1c and 1d of the first house part 1a are provided with a plurality of ventilation holes 13a and 13b separate from each other in order to allow the diaphragm 2 to vibrate smoothly. The inside of semicircular walls 10a and 10b next to them is provided with semicircular projections 14a and 14b for positioning and fixing the diaphragm 2 so that they face each other at both ends in the longitudinal direction. An external periphery of one semicircular wall 10a is provided with grooves 15a and 15b having a semicircular cross-section through which lead wires of the voice coil 3 are pulled out. An external surface is provided with a seat surface 16 for positioning and fixing the external terminal 6.

The outer cylindrical wall 11 of the second house part 1b is provided with a pair of engaging claws 17a and 17b protruding outward for fixing the fitted cover 7 so that they face each other on the line passing through the center of the circle in the lateral direction of the elliptic wall 10.

Figure 5:
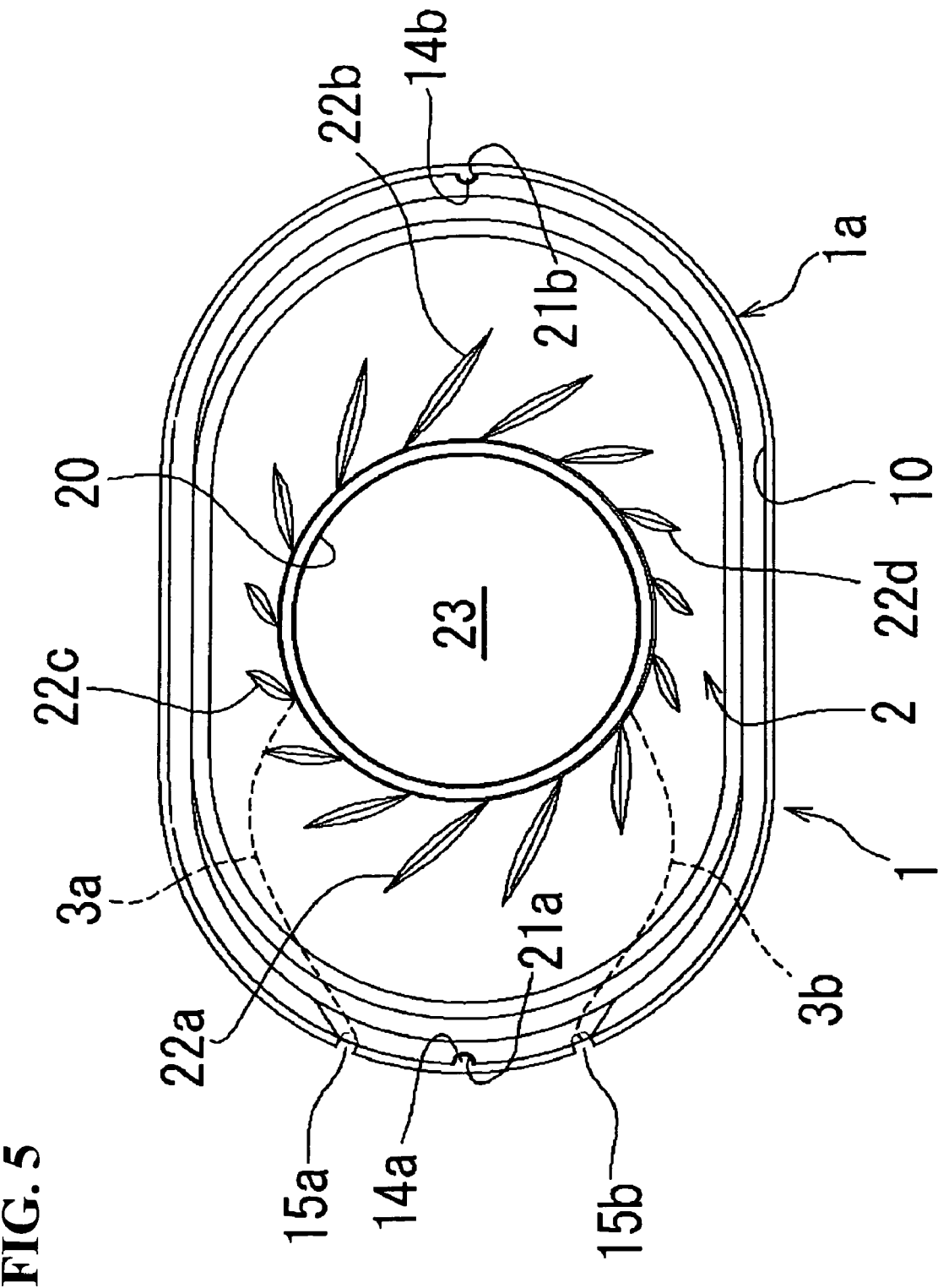
FIG. 5 is a top view showing a housing in which the diaphragm in FIG. 1 is fitted and fixed.

The diaphragm 2 is of a thin plate type having an elliptic shape of which the external periphery is commonly formed with the inside diameter of the elliptic wall 10 as shown in FIG. 5. This elliptic diaphragm 2 can maintain high tone quality and output by increasing a frequency band and can keep the same total area despite a width narrower than a circular diaphragm.

The diaphragm 2 is provided with an annular protrusion 20 for fixing the voice coil 3 at the center of the plate surface. The longitudinal ends of the external periphery are provided with semicircular notches 21a and 21b that engage semicircular projections 14a and 14b provided to the elliptic wall 10 of the first house part 1a to position the whole surface.

The plate surface of the diaphragm 2 is provided with a plurality of V-grooves 22a, 22b, 22c and 22d that radially and tangentially extend from a dome-shaped part 23 surrounded by the voice coil 3 (see FIG. 1) at the center of the plate surface. Each V-groove inclines at the same angle against the annular protrusion 20. The V-grooves are long on the semicircular plate surfaces located at both sides in the longitudinal direction and short on the plate surfaces located at both sides in the lateral direction.

The diaphragm 2 provided with the V-grooves 22a, 22b, 22c, and 22d can prevent a phase shift of the sound wave transmitted to the plate surface, maintain high tone quality and output as a speaker function, and secure high rigidity of the plate with an elliptic shape.

The annular voice coil 3 is installed to the annular protrusion 20 located at the center of the plate surface of the diaphragm 2. Lead wires 3a and 3b of the voice coil 3 are pulled out from the outer surface of the voice coil 3 located outside the dome-shaped part 23 at the center of the plate surface and separated to positive and negative poles extended over the same semicircular area so as to be electrically connected to the external terminal 6 as described later. The voice coil 3 is installed so as to keep the weight balance of the diaphragm 2 equal in the condition where these lead wires are pulled out.

Figure 6:
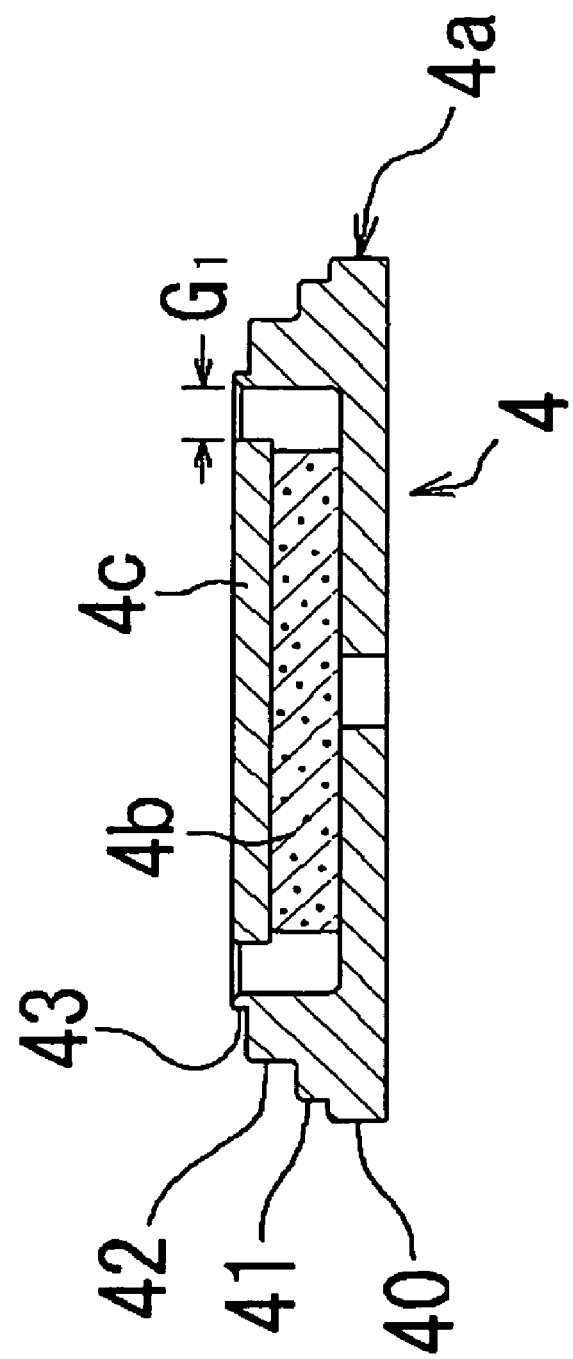
FIG. 6 is a cross-sectional view showing a magnetic circuit part configuring the multifunction-type vibration actuator in FIG. 1.

The magnetic circuit part 4 is an integral assembly consisting of three parts, namely a yoke 4a as a base, a magnet 4b installed inside the yoke 4a, and a pole piece 4c stacked on the magnet 4b as shown in FIG. 6. In this magnetic circuit part 4, a magnetic gap $G_1$ is maintained between the internal periphery of the yoke 4a and the external periphery of the magnet 4b.

The magnetic circuit part 4 that is formed with an assembly consisting of the yoke 4a, the magnet 4b, and the pole piece 4c, all of which are circular and can be housed in the cylindrical wall 11 of the second house part 1b. The circular yoke 4a, magnet 4b, and pole piece 4c that are easy to form and assemble can keep manufacturing costs low to provide a cheap product.

The yoke 4a is provided with a maximum diameter part 40 so as to maintain the very small clearance with the cylindrical wall 11 of the second house part 1b. In addition, the yoke 4a is provided with peripheral steps 41 and 42 having incrementally smaller diameters in order to keep the entire weight optimum and a rising peripheral wall capable of incorporating a step part 43 for fitting the suspension 5, the magnet 4b, and the pole piece 4c.

Figure 7:
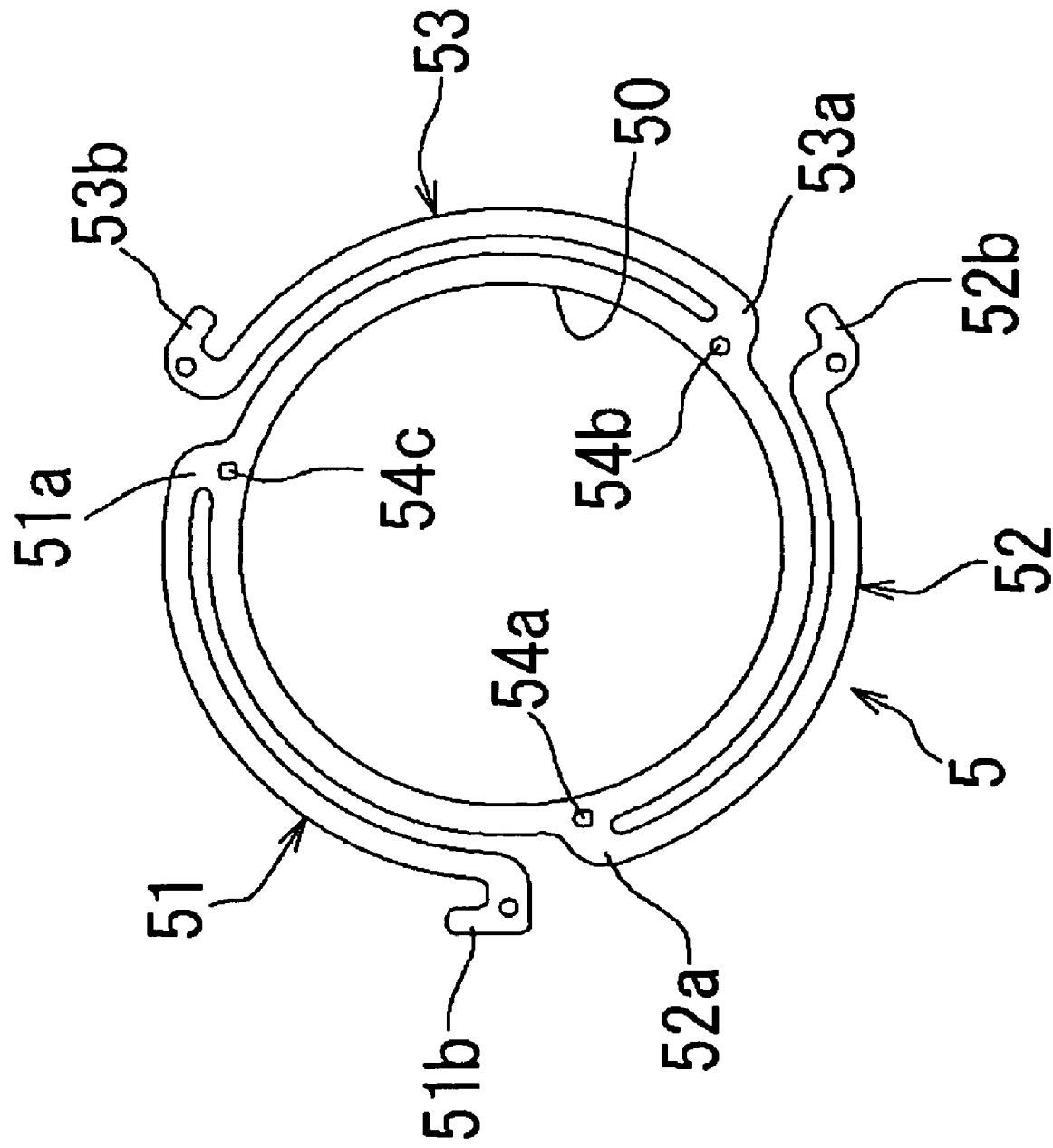
FIG. 7 is a top view showing a suspension configuring the multifunction-type vibration actuator in FIG. 1.

The suspension 5 is a leaf spring-like component having a central ring part 50 and three arm parts 51 through 53 as shown in FIG. 7. The arm parts 51 through 53 are formed so as to circumferentially extend in the same direction with the same length from the proximal ends of the ring 50 120° apart from each other. The distal ends 51b through 53b of the arm are bent in the arm extending direction or in the opposite direction to form an L-letter-like shape.

The ring part 50 of the suspension 5 is provided with pin hole-like punched openings 54a through 54c in the positions adjacent to the proximal ends 51a through 53a of the arm, respectively. The punched openings 54a through 54c are used for the laser weld with a stepped surface of the yoke 4a fitted with the ring part 50 of the suspension 5 to integrally install and fix the magnetic circuit part 4 to the suspension 5.

Figure 8:
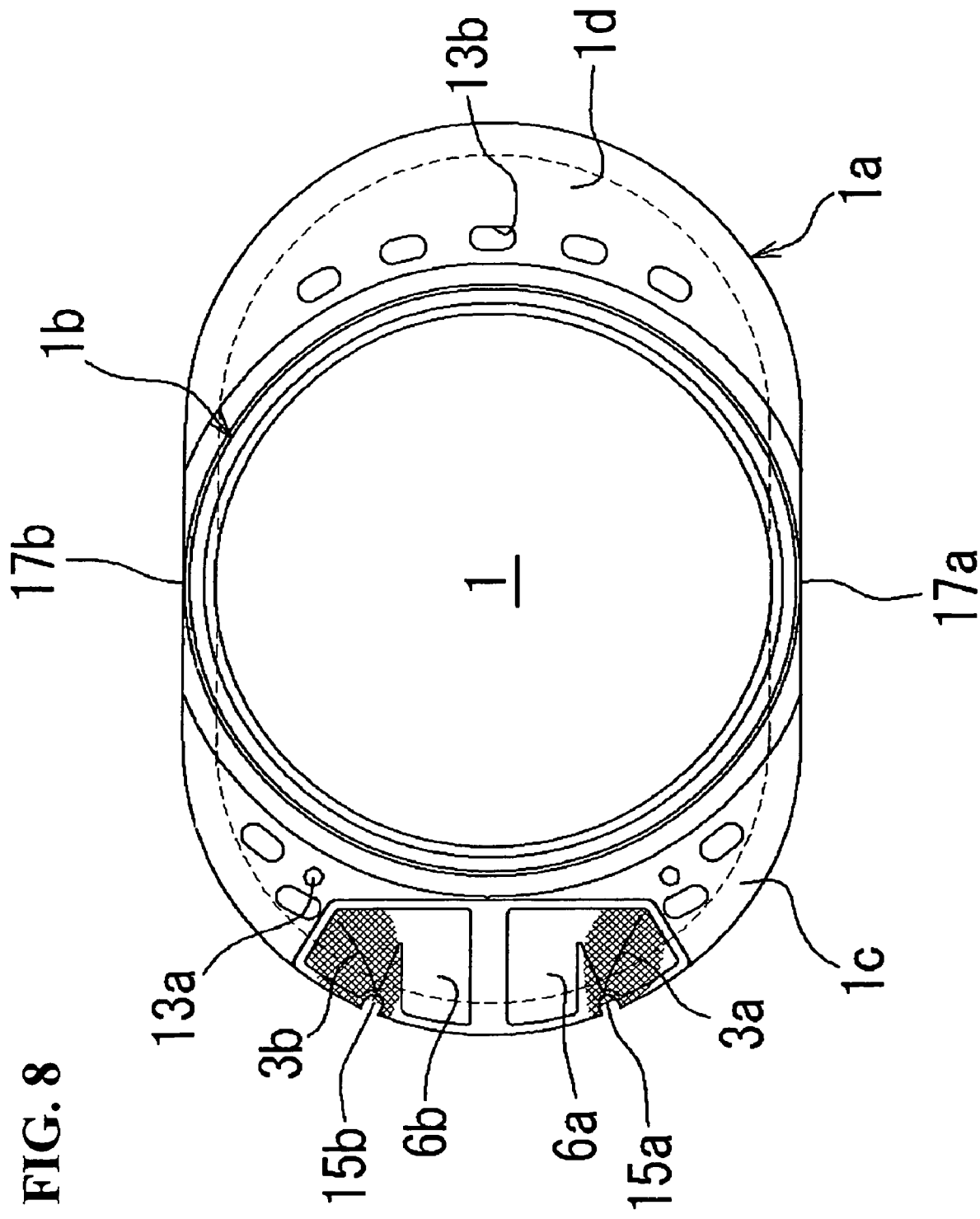
FIG. 8 is a back view showing the housing equipped with the external terminal in FIG. 1.

A printed circuit board printed with a desired circuit pattern is used as the external terminal 6, which are provided with electrode parts 6a and 6b electrically isolated to provide positive and negative poles. This printed circuit board 6 is installed so as not to protrude from the periphery of the housing 1 as shown in FIG. 8 because it is fitted to a seat surface 16 (see FIG. 1) provided to the outer area of the bottom wall 1c, one of the two bottom walls, and securely bonded.

A cylindrical cover 7 with a bottom is capped over the periphery of the second house part 1b. A peripheral surface of the cover 7 is provided with slots 70 and 71 to engage the engaging claws 17a and 17b of the second house part 1b in the position 180° apart from each other (see FIG. 1).

Figure 9:
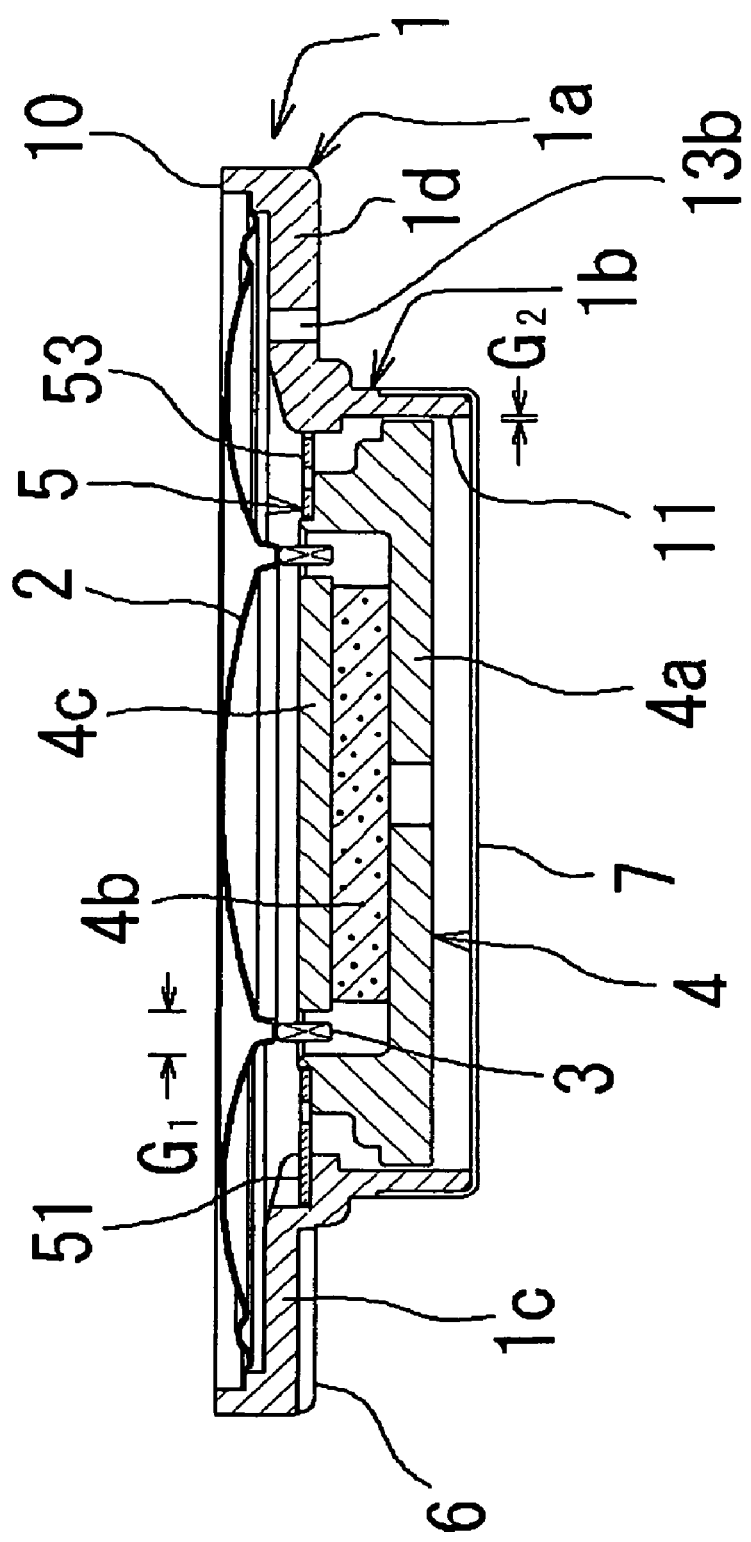
FIG. 9 is a cross-sectional view showing an assembled condition of the multifunction-type vibration actuator in FIG. 1.

In order to assemble a multifunction-type vibration actuator with the above-described components shown in FIG. 9, the magnetic circuit part 4 is installed inside the cylindrical wall 11 using the suspension 5, which is fixed by fitting the distal end 51b of one arm part 51 extending from the inside of the second house part 1b to a dent 12a provided at the center of the surface of the bottom wall 1c, one of the two bottom walls, and is fixed by fitting the distal ends 52b and 53b of two arm parts 52 and 53 extending from the inside of the second house part 1b to dents 12b and 12c provided to both sides of the surface of the other bottom wall 1d so as to integrally hold the magnetic circuit part 4.

During the assembly of the actuator, the suspension 5 can be easily and correctly installed by fitting the distal ends 51a through 53a of the arm with different shapes to the dents 12a and 12c that correspond to the distal ends 51a through 53a of the arm, respectively. The magnetic circuit part 4 to be held at three points by the suspension 5 enables to provide stable vibration performance. The suspension 5 is easily provided with large amplitude because of the presence of the long arm parts 51 through 53, minimizing the generation of metallic fatigue due to vibration.

The diaphragm 2 is installed to the first house part 1a by fitting tightly inside the ellipse and is fixed by bonding to the external periphery. This installation can easily and correctly be performed because the whole surface of the diaphragm 2 is positioned by semicircular projections 14a and 14b of the peripheral wall 10 with semicircular notches 21a and 21b of the external periphery.

The voice coil 3 is inserted into a magnetic gap $G_1$ of the magnetic circuit part 4 for positioning when the diaphragm 2 is assembled. The lead wires 3a and 3b divided into positive and negative poles on the same semicircular area of the diaphragm 2 are pulled toward the opposite surface of the diaphragm 2 through grooves 15a and 15b provided to a semicircular wall 10a, and the ends of the lead wires are connected to the electrode parts 6a and 6b of the printed circuit board by soldering.

The cover 7 is capped over the external periphery of the second house part 1b and fixed to an opening side of the second house part 1b by engaging the engaging claws 17a and 17b with the slots 70 and 71, respectively.

The multifunction-type vibration actuator configured like this is assembled by directing the installation side of the diaphragm 2 outwardly and the installation side of the cover 7 inwardly inside the equipment case because the actuator has a construction where vibration is transmitted toward the outside of the housing of portable communication equipment. In a multifunction vibration actuator in which a printed circuit board of the other part is mounted inside the equipment case due to the assembly and construction, the occupied area of the multifunction-type vibration actuator is set by the area of the installation side of the cover 7.

Figure 10:
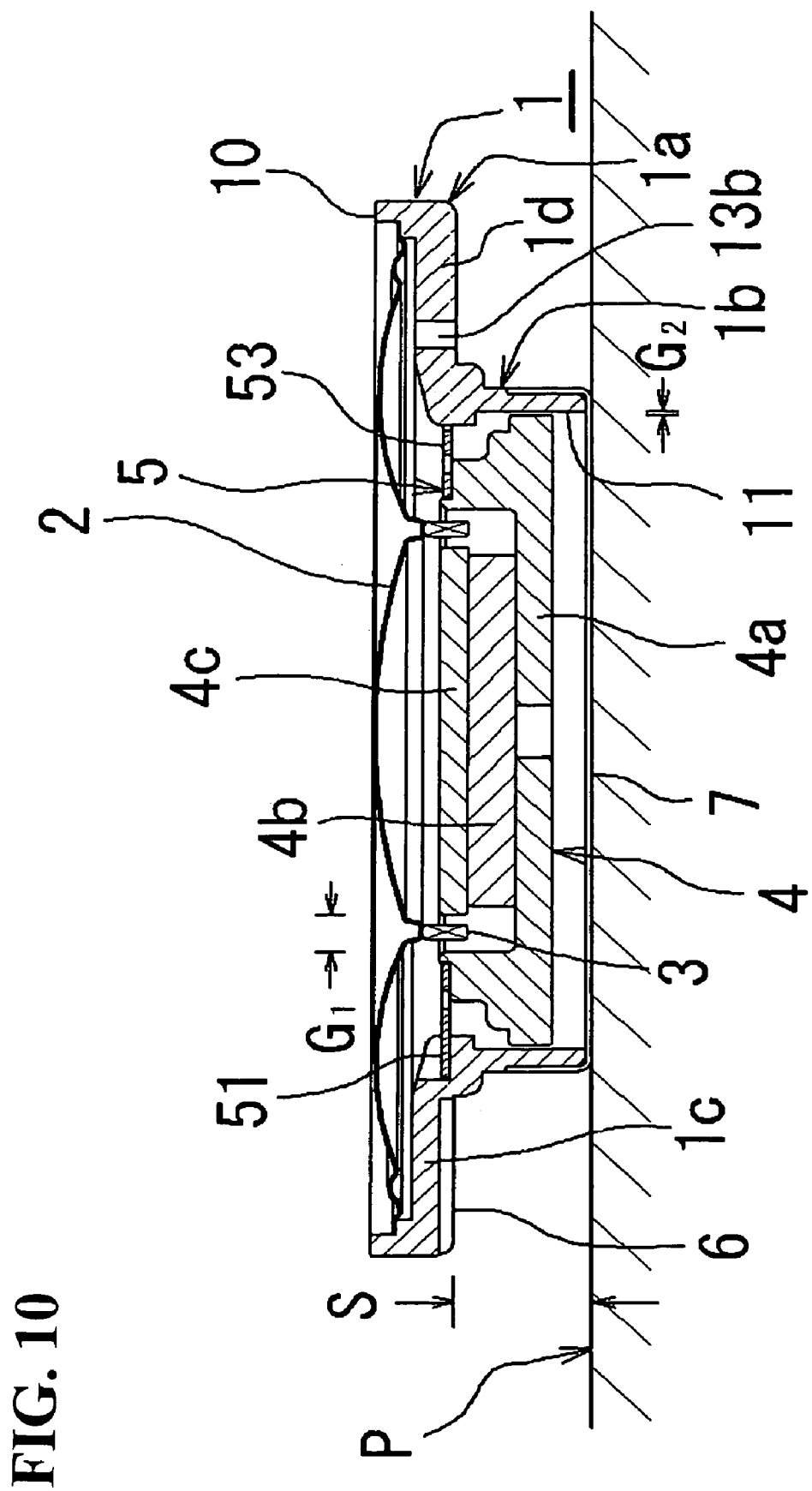
FIG. 10 is an explanatory view showing a mounted condition of the multifunction-type vibration actuator in FIG. 1.

A space between the installation side of the cover 7, namely the underside of the bottom walls 1c and 1d extending from the second house part 1b, and a mounting surface P shown in FIG. 10, can be effectively used as a mounting space S for other parts. Therefore, both the lateral and longitudinal spaces between the elliptic wall 10 and the cylindrical wall 11 can be saved.

The yoke 4a of the magnetic circuit part 4 with the maximum diameter portion 40 capable of maintaining the minimum clearance $G_2$ with the cylindrical wall 11 of the second house part 1b enables to increase the frequency band for generating vibration of the magnetic circuit part 4 by controlling the amounts of air traveling inside the space formed between the diaphragm 2 and the magnetic circuit part 4 and air inside the space formed between the magnetic circuit part 4 and the cover 7.

More specifically, it is possible to increase a frequency band for generating body-felt vibration to signal an incoming call by using air inside the actuator as a damper and sensing the up and down movement of the magnetic circuit part 4 caused by the vibration. Thus, the acceleration necessary for body-felt vibration can be generated in a broader frequency band to prevent a resonance point from coming off the frequency band, facilitate the determination of the resonance point, and stabilize the characteristics of the body-felt vibration.

In addition, the ability to reduce the loss of acceleration corresponding to a variation in frequency can stabilize the fluctuation of the characteristics of the body-felt vibration due to the shift of the resonance point, which may vary depending on the slightly different manufacturing condition of multifunction-type vibration actuators. Thus, even the shift of the resonance point generated by the change of environment where a terminal device mounted with a multifunction-type vibration actuator is used, it is possible to prevent an amount of body-felt vibration from being significantly or completely lost.

DESCRIPTION OF REFERENCE CHARACTERS

1 Housing
1a First house part
1b Second house part
1c and 1d Bottom walls of first house part
10 Elliptic wall of first house part
11 Cylindrical wall of first house part
2 Diaphragm
22a through 22d V-groove of diaphragm
23 Dome-shaped part of diaphragm
3 Voice coil
3a and 3b Lead wires of voice coil
4 Magnet circuit part
4a Yoke of magnetic circuit part
40 Maximum diameter part of yoke
41 and 42 Peripheral steps of yoke
43 Stepped part for fitting suspension
4b Magnet of magnetic circuit part
4c Pole piece of magnetic circuit part
5 Suspension
50 Ring part of suspension
51 through 53 Arm part of suspension
51a through 53a Proximal ends of arm parts
51b through 53b Distal ends of arm parts
6 External terminal
$G_1$ Magnetic gap

The invention claimed is:

1. A multifunction-type vibration actuator comprising:
a thin plate-like diaphragm to an inner surface of which is installed:
a voice coil; a magnetic circuit part composed of a yoke, a magnet, and a pole piece; and a leaf spring-like suspension for holding said magnetic circuit part, said magnet circuit part is assembled inside a wall of a housing with said suspension, said voice coil is inserted into a magnetic gap of said magnetic circuit part such that said diaphragm fits tightly inside said wall of said housing, and said voice coil is electrically connected to an external terminal with lead wires pulled out to an outside of said wall,
wherein said housing is integrally formed with a first house part with an elliptic wall and a second house part with a cylindrical wall of which a diameter corresponds to a width of said first house part at a center of a ellipse at both bottom walls of said first house part,
said elliptic diaphragm to which an inner surface of said annular voice coil is installed,
said circular magnetic circuit part provided with a magnetic gap into which said voice coil is inserted, and
said suspension is disk-shaped, said elliptic diaphragm fits tightly inside a wall of said first house part, and said circular magnetic circuit part is assembled in a cylinder of said second house part with said suspension, and
wherein the multi-function type vibration actuator comprises only one voice coil and only one magnet.

2. A multifunction vibration actuator according to claim 1, wherein said elliptic diaphragm of which plate surface is provided with a plurality of V-grooves that radially extend at a same angle from a dome-shaped part surrounded by an annular voice coil at a center of a plate surface and that are long on semicircular plate surfaces located at both sides in a longitudinal direction and short on plate surfaces located at both sides in a lateral direction.

3. A multifunction vibration actuator according to claim 1 or 2, wherein said elliptic diaphragm includes lead wires of said voice coil pulled out toward both sides while divided into positive and negative poles on a same semicircular plate surface from a dome-shaped part at a center of said plate surface.

4. A multifunction vibration actuator according to claim 1, wherein said suspension comprises a central ring part for holding a circular magnetic circuit part and three arm parts circumferentially extending in a same direction with a same length from the proximal ends of arms located apart from each other at an angle of 120° on a ring part, a distal end of one of said arm parts extending outward from a second house part is fitted and fixed in a dent located in middle of one of bottom wall surfaces and said distal ends of remaining two arm parts extending outward from said second house part are fitted and fixed in dents located at both sides of another bottom wall surface of said first house part.

5. A multifunction vibration actuator according to claim 4, wherein said suspension having three arm parts of which distal ends are formed in different shapes, dents corresponding to a shape of each arm distal end are provided in a bottom wall surface of said first house part to install a suspension in a cylinder of said second house part by fitting said distal ends of said arms in dents.

6. A multifunction vibration actuator according to claim 1, wherein an external terminal electrically connected to a voice coil is formed with a printed circuit board and said printed circuit board is installed to a bottom wall surface opposite to a diaphragm fitted surface at one of bottom walls of said first house part.

7. Portable communication equipment mounted with a multifunction vibration actuator according to claim 1.

* * * * *

UNITED STATES PATENT AND TRADEMARK OFFICE
CERTIFICATE OF CORRECTION

PATENT NO.         : 7,529,381 B2
APPLICATION NO. : 10/590319
DATED                 : May 5, 2009
INVENTOR(S)       : Shoichi Kaneda It is certified that error appears in the above-identified patent and that said Letters Patent is hereby corrected as shown below:

On the Cover Page:

Item (73) Assignee: should read as follows: NAMIKI SEIMITSU HOUSEKI KABUSHIKI KAISHA, Tokyo (JP)

Signed and Sealed this

Twenty-ninth Day of December, 2009

David J. Kappos
*Director of the United States Patent and Trademark Office*